United States Patent [19]

Fowler

[11] 4,327,945

[45] May 4, 1982

[54] HIGH LIFT, SIDE DUMPING VEHICLE

[75] Inventor: Larry G. Fowler, Belle Glade, Fla.

[73] Assignee: Inter-American Transport Equipment Company, Miami, Fla.

[21] Appl. No.: 173,886

[22] Filed: Jul. 31, 1980

[51] Int. Cl.³ .............................................. B60P 1/34
[52] U.S. Cl. .................................... 298/11; 298/18
[58] Field of Search .................. 298/11, 18; 414/346, 414/424, 471, 742

[56] References Cited

U.S. PATENT DOCUMENTS

| | | | |
|---|---|---|---|
| 2,286,416 | 6/1942 | Holmstrom | 180/54 |
| 2,812,210 | 11/1957 | Osborn | 298/18 |
| 3,083,058 | 3/1963 | Walstrom et al. | 298/11 |
| 3,205,011 | 9/1965 | Diem | 298/10 |
| 3,362,085 | 1/1968 | Clifford et al. | 298/11 X |
| 3,830,543 | 8/1974 | Kostman | 298/10 |
| 3,844,617 | 10/1974 | Kostman | 298/1 |
| 3,880,468 | 4/1975 | Steingas et al. | 298/11 |
| 3,937,502 | 2/1976 | Gay | 298/11 |
| 4,019,780 | 4/1977 | Bishop | 298/11 |
| 4,029,357 | 6/1977 | Bishop | 298/11 |
| 4,061,235 | 12/1977 | Suarez | 298/11 |

Primary Examiner—Leslie J. Paperner
Attorney, Agent, or Firm—Fleit & Jacobson

[57] ABSTRACT

A transporter or vehicle for articles having a container for receiving articles to be transported. A frame assembly supports the container on a chassis. Guides extend vertically upwardly from the chassis for guiding vertical translation of the frame, and the frame is pivotally connected to an upper portion of the container so that the container is rotatable about one of its side edges. Piston-cylinder units are interconnected between fore and aft portions of the chassis and the container in such manner that initial movement of the pistons out of the cylinders vertically translates the interconnected frame and container. After the frame and container have reached a predetermined height, continued movement of the pistons out of the cylinders results in pivoting of the container with respect to the frame to thereby dump the contents of the container. The points of connection of the piston-cylinder units to the container and the pivotal interconnection between the container and frame are such that the center of gravity of the container is always located between the outer side edges of the transporter so that there is no need to provide outriggers to prevent overturning of the vehicle during a dumping operation. Also, the same piston-cylinder units are used to both raise the container and to pivot the container with respect to the frame.

7 Claims, 7 Drawing Figures

HIGH LIFT, SIDE DUMPING VEHICLE

BACKGROUND OF THE INVENTION

Field of the Invention

The present invention pertains generally to the field of dumping vehicles and wagons, and more particularly to dump wagons for agricultural and other uses in which it is necessary to provide a relatively high dumping position for the material container, while maintaining a relatively low transport position for the container.

The invention, still more particularly, relates to a vehicle with a hydraulic side dumping mechanism for dumping the contents of a container over a top side rail of the container. The vehicle is intended, for example, for the loading and unloading of sugar cane.

Dump vehicles for hauling and dumping bulk articles are widely used for agricultural purposes, wherein the vehicle often takes the form of a wagon adapted to be drawn behind a farm tractor. The wagon has a relatively tall sided material container, often having sloping sides so that all the material will pour out when the container is dumped. It is generally desirable in such wagons to provide a dumping mechanism so that when the container is dumped, the pouring edge along one side of the container will be elevated to a fairly high position to facilitate dumping sugar cane and the like into high sided trucks or trailers, railroad cars, or storage bins. At the same time, it is desirable to provide a relatively low transport position for the container so that the stability of the wagon as it moves over uneven ground will be improved, and so that no clearance problems are created by the wagon which would impair its usefulness in conjunction with other farm implements such as combines, and so that it is not too tall to fit into storage buildings.

The conflicting design requirements for a low transport height and a high dumping height have led to a number of prior art dumping wagons. U.S. Pat. No. 2,286,416 to Holmstrom and U.S. Pat. No. 2,812,210 to Osborn describe previously known dumping vehicles in which containers are pivotable about edges of the containers to dump the contents of the containers. Another prior art wagon is shown in U.S. Pat. No. 3,083,058 to Walstrom et al. This patent uses an upright slanting rail assembly and a first pair of hydraulic rams to move the container up the rail assembly to gain additional dumping height. A second pair of hydraulic cylinders dumps the elevated container. This structure, however, suffers from the disadvantages of requiring extra actuators, thereby increasing cost, and also from the disadvantage of requiring high vertical clearance for the rail assembly, even when the container is in its down position.

Another prior art approach to the problem is illustrated by U.S. Pat. No. 3,205,011, to Diem. In this structure, the gain in dumping height is achieved by rigidly affixing the material container on a pivot arm a distance from the pivot point of the arm. The distance away from the pivot point that the pouring edge is positioned equals the gain in dumping height as the pivot arm is rotated upward. A disadvantage of this structure is that if a significant height increase is to be achieved, the container must be displaced to the side of the wagon, thereby leading to either excessive width of the wagon or else reduced volume of the material container. Another disadvantage is that the center of gravity of the wagon is shifted toward one side during transportation, adversely affecting stability when the wagon is drawn over uneven ground.

Still another example of a prior art dumping wagon is illustrated by U.S. Pat. No. 3,830,543 to Kostman. This patent describes a transport vehicle which has the capability of attaining a high lift dumping position by use of a mechanical linkage in conjunction with a hydraulic actuator. During a dumping operation, the first movement of the vehicle's container is in a horizontal plane, the distance of which regulates the additional dumping height of the container above the vehicle, before the container pivots with respect to the vehicle. With the first movement of the container being in a horizontal plane, several problems are experienced. For instance, should an extremely high lift be required, there must be a limitation on the profile height of the tires of the unit so that the container can move above the tires to attain the desired dumping height. Additionally, should large diameter tires be required for floatation and support of the vehicle, the dumping container must be provided with a wheel well or fender which decreases its volume. Also, the track or center distance between the tires of the vehicle required by existing field row characteristics limits the versatility of the unit.

Another example of a prior art dumping wagon is shown in U.S. Pat No. 3,844,617 to Kostman. This patent describes a dumping vehicle having a high lift accomplished by the use of telescoping struts that support container pivots. When the struts are extended, the center of gravity of the container is moved towards the dumping side tires, which impairs the stability of the vehicle. In some instances, it is necessary to use stabilizing pads on the vehicle to prevent its overturning during a dumping operation.

In summary, some of the previously known vehicles have used four hydraulic cylinders, with two cylinders being used to raise the container and two cylinders being used to tilt and dump the container, while other previously known systems have used outrigger supports to prevent overturning of a vehicle during lifting and tilting of the vehicle's container.

SUMMARY OF THE INVENTION

According to the present invention, there is provided an improved dump vehicle or trailer having a wheeled transport carriage and a material container mounted on the carriage for transportation in a relatively low position, and movable for dumping toward the side into a relatively high dumping position. The dumping mechanism to achieve this result comprises a container for receiving bulk articles that can both be raised and tilted, a wheeled chassis for supporting the container, a frame supported by the chassis and pivotally connected to a side edge of the container, guides extended upwardly from the chassis for guiding up and down movement of the frame, and at least one piston-cylinder unit interconnected between the container and chassis for exerting a force on the container such that the interconnected frame and container are vertically translated as a unit from a lowered to a raised position and, after reaching the raised position, the container is pivoted with respect to the frame to dump the contents of the container.

When the vehicle of the present invention is used for transporting sugar cane, one side of the unit must be low in order to accommodate loading equipment, such as, a grab type cane loader for full length cane and a combined harvester or other type of loading device for chopped cane. The in field transport vehicle must also be able to unload into highway-type transport units or other receptacles for long distance transport or immediate processing of the product. In order to transfer its contents into such transport units or processing receptacles, the container must be raised to clear the sides of the receptacle receiving its contents, for instance, the container must often be able to clear over thirteen feet of vertical height.

With the present invention, a container is pivotally connected to a frame guided for vertical movement on slide columns extending upwardly from a chassis. Piston-cylinder units extend between fore and aft portions of the chassis and the container. The relationship between the points of connection of the piston-cylinder units to the container and the pivotable connection between the container and frame are such that the weight of the container (whether loaded or unloaded) overcomes any tendency of the container to pivot with respect to the frame. Thus, the frame and container are vertically raised by the piston-cylinder units until upward movement of the frame is prevented by stops. Continued movement of the container by the same piston-cylinder units results in pivoting of the container with respect to the frame so that the contents of the container are dumped. The container is designed in such manner that during the entire raising and dumping process the center of gravity of the container never moves outside of the tires supporting the vehicle, thus preventing overturning of the vehicle.

Since the same pair of piston-cylinder units are used to both raise and tilt the controller and since no outriggers are needed to provide stability during a dumping operation, the vehicle of the present invention is relatively simple and can be moved to a dumping location, dumped, and returned to the fields quickly and efficiently. Only one control is necessary for the entire dumping operation and the dumping operation can be performed by the operator of the towing vehicle without leaving the towing vehicle.

The invention, and its objects and advantages will become more apparent in the detailed description of a preferred embodiment hereinafter presented.

BRIEF DESCRIPTION OF THE DRAWINGS

In the detailed description of the preferred embodiment of the invention hereinafter presented, reference is made to the accompanying drawings, in which.

DESCRIPTION OF THE PREFERRED EMBODIMENT

Because side dumping vehicles are well-known, the present description will be directed in particular to elements forming part of, or cooperating more directly with, the present invention. Elements not specifically shown or described herein are understood to be selectable from those known in the art.

Referring now to the drawings, an embodiment of a high lift, side dumping vehicle according to the present invention, generally designated 10, is illustrated. The vehicle 10 is designed for hauling and dumping bulk articles, such as agricultural products like sugar cane and the like. The vehicle is designed for off-road towing behind a tractor or other agricultural implement to receive agricultural products being harvested and has a container that is designed to be raised to an elevated position to dump received products into a truck, trailer, or railway car, or to dump products into a container for temporary storage or immediate processing.

Major components of the vehicle 10 include a wheeled chassis, support frame, or carriage, generally designated 12; a container, dump body, or hopper, generally designated 14, for bulk articles to be hauled and dumped; and a support frame, generally designated 16, pivotally connected to an upper side edge of the container 14. Slider posts or guides 18 are connected to and extend vertically upwards from the chassis 12. The support frame includes a slider assembly, generally designated 20, that is movably guided on the guides 18. Piston-cylinder units 22 and 24 are interconnected between the chassis 12 and container 14 to control movement of the container 14 and support frame 16 between lowered and raised positions and to control pivoting of the container 14 with respect to the support frame 16.

Figures 5, 7:
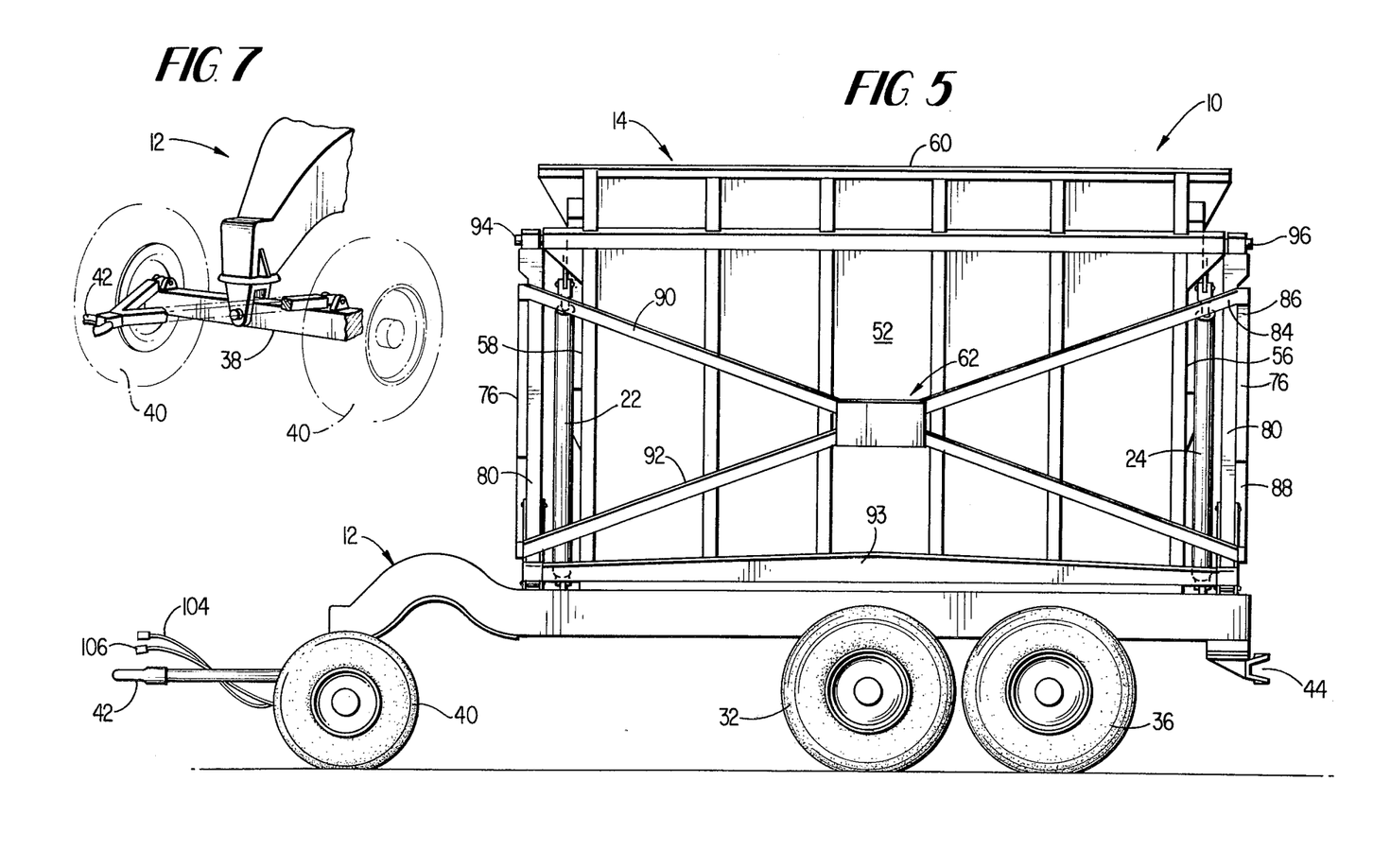
FIG. 5 is a left side view of the vehicle of FIG. 1.
FIG. 7 is a partial front view of the vehicle of FIG. 1.

Considering in more detail the chassis 12, the chassis includes brackets 26 for supporting axles 28. Sets of tires 30, 32 and 34, 36 are mounted on ends of the axles 28. It will be appreciated that the number of axles and the number of tires will vary, depending on the characteristics of terrain to be covered by the vehicle and the weight of articles to be hauled. As illustrated in FIG. 7, the leading end of the chassis 12 pivotally supports an axle 38. The axle 38 supports a set of tires 40 and a tow bar or attachment 42. The rear of the chassis 12 is provided with a towing attachment 44 so that a plurality of vehicles can be interconnected with each other. As previously mentioned, guides 18 are rigidly connected to and extend vertically upwardly from fore and aft portions of the chassis 12. Sets of brackets 46, 48 are spaced, in the lengthwise direction of the chassis, inwardly from and adjacent the guides 18. Ends of the piston-cylinder units 22, 24 are connected to the brackets 46 when it is desired to dump the container 14 to the right side of the vehicle, while the brackets 48 are used when it is desired to dump the container 14 to the left side.

Considering now the container 14, it has a generally trough or V-shape. Side walls 50 and 52 diverge upwardly from the base 54 of the container, while the end walls 56, 58 are vertically disposed. Preferably, in order to reduce the weight of the container, the end walls 56 and 58 and the side wall 50 are formed by interconnected frame members covered with wire mesh. As can be clearly seen from FIGS. 2 and 3, the side wall 52 is higher than the side wall 50. As can be seen from the phantom line position in FIG. 4, the upper side edge 60 of the side wall 52, in a load discharging position of the container 14, forms a lip extending over the adjacent side wall of a trailer T or other container receiving material being discharged or dumped from the container. Preferably, the lip 60 extends downwardly into the adjacent container to minimize spillage of the contents of the container 14 during dumping. Since the material being dumped slides along the side wall 52, the side wall 52 is preferably formed of solid material, as illustrated in FIG. 5.

Figure 6:
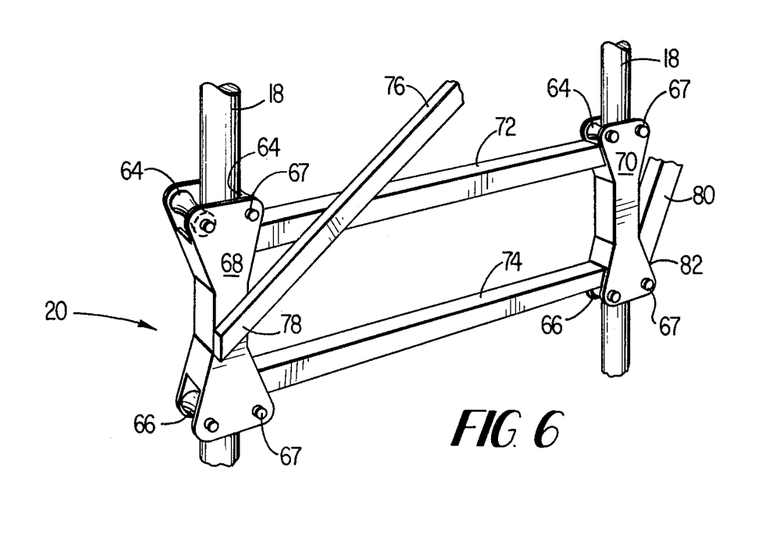
FIG. 6 is a partial, enlarged view of the support frame and guides of the vehicle of FIG. 1.

Considering now the support frame 16, the frame 16 comprises fore and aft interconnected slider assemblies 20 and fore and aft strut assemblies, generally designated 62. As best illustrated in FIG. 6, each of the slider assemblies 20 has a pair of spaced apart upper rollers 64 and a pair of spaced apart lower rollers 66. Preferably, the rollers 64 and 66 are contoured to conform with the outer periphery of the guides 18. The rollers 64 and 66 are mounted on shafts 67 carried by plate members 68 and 70. Cross bars 72 and 74 interconnect the plate members 68 and 70 for conjoint vertical movement.

Figure 4:
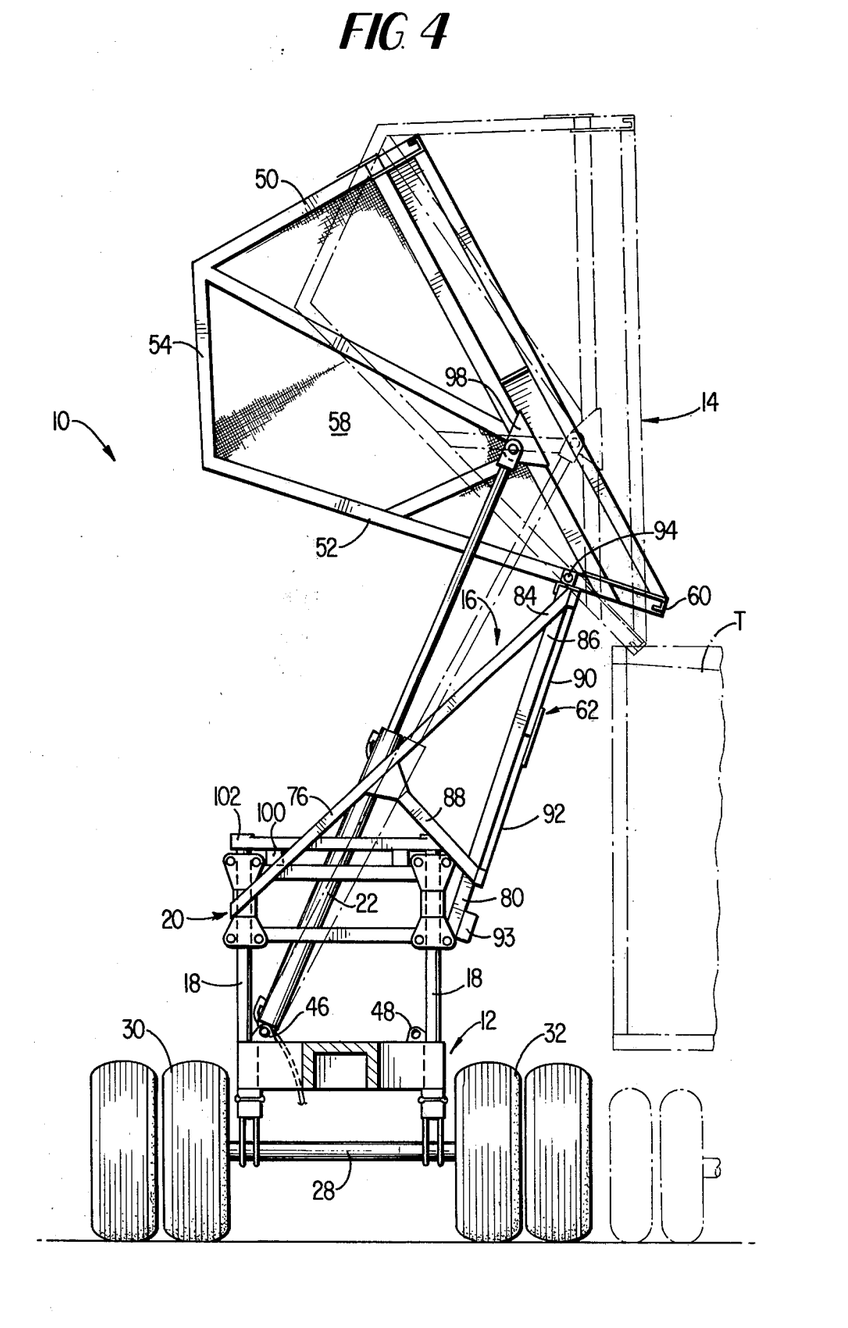
FIG. 4 is a view similar to FIG. 2, with the container and supporting frame of the vehicle in a raised position and the container in an intermediate dumping position.

Referring now to FIGS. 4 and 5, it can be seen that each of the strut assemblies 62 extends upwardly from a respective one of the slider assemblies 20. The strut assembly 62 includes a first strut 76 having a lower end 78 rigidly connected to plate 68 of the slider assembly 20. A second strut 80 has a lower end 82 rigidly connected to the plate 70. The first and second struts have upper ends 85 and 86, respectively, rigidly connected to each other. A third strut 88 is connected to the first and second struts immediate their ends to provide bracing. Strut assemblies 90 and 92 and strut 93 extend between and interconnect the fore and aft strut assemblies 62. Shafts 94, 96 pivotally connect upper portions of the strut assemblies 62 with upper fore and aft portions of the container 14 in such manner that the container 14 is pivotal about the shafts 94 and 96 to dump the contents of the container. Preferably, the shafts 94 and 96 are pivotally received in frame members forming corners of the container 14.

Figure 1:
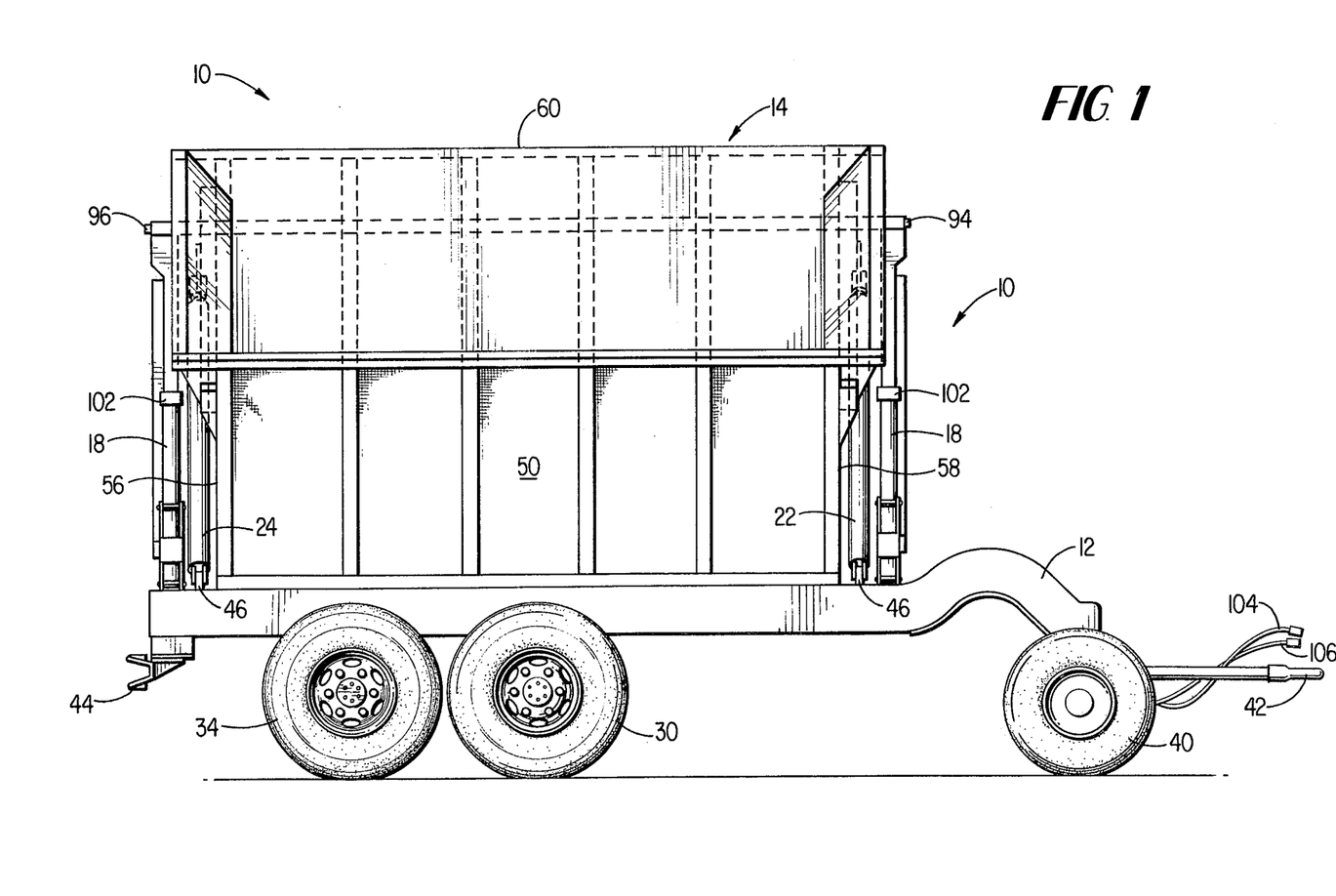
FIG. 1 is a right side view of an embodiment of a high lift, side dumping vehicle according to the present invention.
Figure 2:
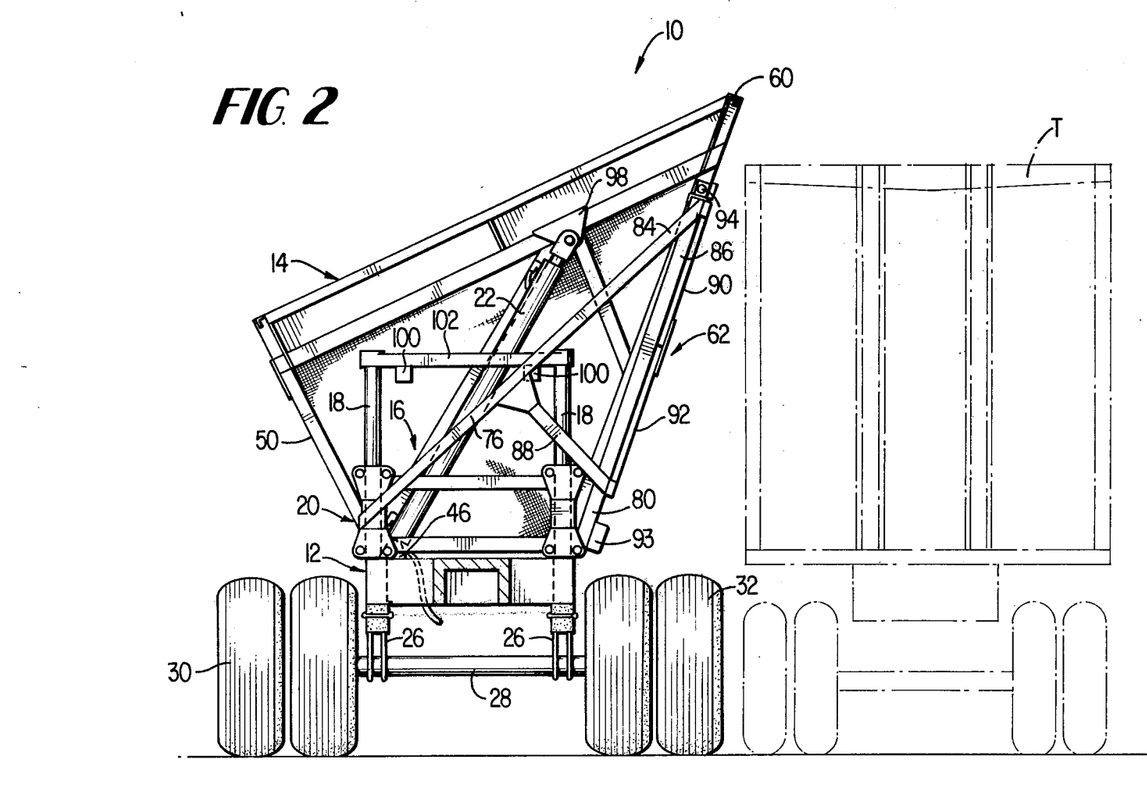
FIG. 2 is a view taken along line A—A of FIG. 1 of the vehicle of FIG. 1 in a transporting position.
Figure 3:
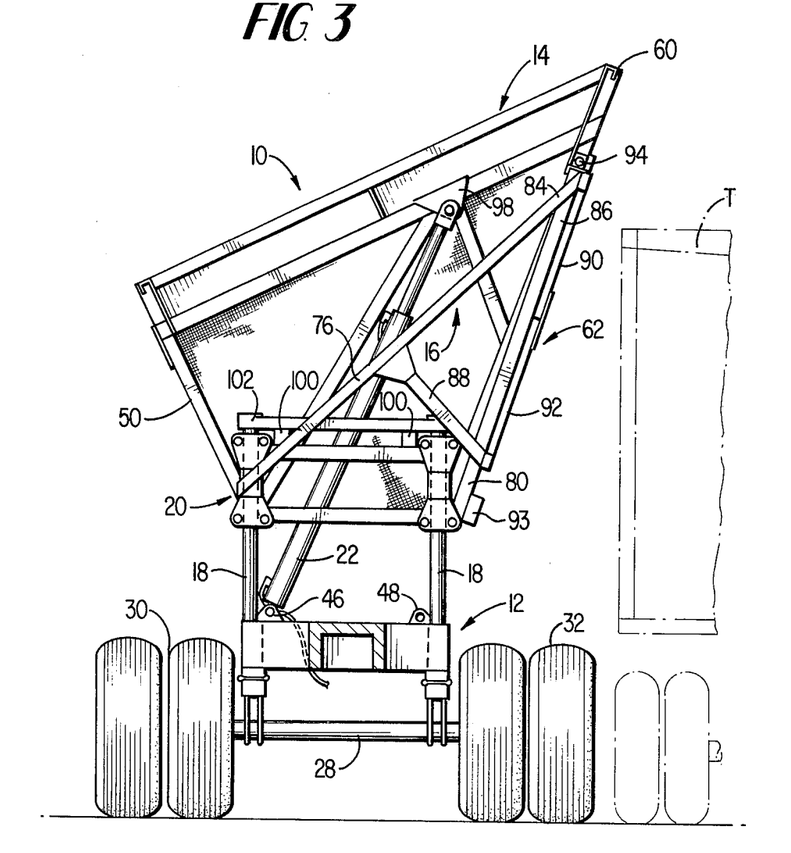
FIG. 3 is a view similar to FIG. 2, with the container and supporting frame of the vehicle in a raised position.

As can be seen from FIGS. 2, 3, and 4, the shafts 94 and 96 are located over the sets of tires 32 and 36 supporting the chassis 12. Also, the center of gravity of the container 14, in all positions of the container, is positioned no wider than the outer edges of the sets of tires 32 and 36. In this manner, tilting of the vehicle during a dumping operation is prevented.

It should also be noted that the brackets 98 connecting the piston-cylinder units 22 and 24 to the container 14 are inwardly spaced from the shafts 94 and 96 a sufficient distance that initial extension of the piston-cylinder units 22 and 24 results in conjoint vertical movement of the container 14 and support frame 16. Such conjoint vertical movement continues until the cross bars 72 of the fore and aft slider assemblies 20 contact stops 100 carried by at least one of the cross bars 102 interconnecting upper ends of guides 18. Preferably, the piston-cylinder units 22 and 24 are double-acting units having hoses or lines or supplying fluid under pressure connectable to a hydraulic or pneumatic system of a towing vehicle. Alternatively or in addition, the hoses 104 and 106 are connectable to similar hoses of additional vehicles positioned ahead of or behind the vehicle. It should be appreciated that the piston-cylinder units 22 and 24 can also be single acting units. An important feature of the present invention is the positioning of the piston-cylinder units between the chassis 12 and container 14 in such manner that the same units are used to both raise and tilt or pivot the container 14. Thus, only one set of connection hoses or lines 104 and 106 are required to control a dumping operation.

Considering now the operation of the vehicle 10, the eye loop of the tow bar 42 is connected to the pintle of a towing vehicle or to a towing attachment 44 of a preceding vehicle. The vehicle 10 is then towed into an agricultural field to be loaded with bulk products. Since the container 14 has a low side wall 50, it is relatively easy to load the container with agricultural products or other articles to be hauled and dumped. After the container has been filled to a desired level, the vehicle 10 is towed to a dumping location, for instance, the location of a trailer T used for long distance hauling. After the vehicle 10 has been positioned adjacent the trailer T, the pistons of the piston-cylinder units 22, 24 are supplied with fluid under pressure to thereby force the pistons out of the cylinders. During initial movement of the pistons, the container 14 and support frame are translated only vertically upwards. The support frame 16, during movement between the lowered transporting position illustrated in FIG. 2 and the raised position illustrated in FIGS. 3 and 4, is guided by the slider posts or guides 18. Conjoint upward movement of the container 14 and support frame 16 is stopped when the upper cross bar 72 contacts the stops 100 carried by the cross bars 102.

Continued movement of the pistons out of the piston-cylinder units after upward movement of the container 14 and support frame 16 has been stopped, results in pivoting of the container 14 about the shafts 94 and 96 carried by the strut assemblies 62. It should be noted that the pivot axis defined by the shafts 94 and 96 moves only in a vertical plane. Since the shafts 94 and 96 defining the pivot axis are carried by the strut assemblies 62, there is no horizontal shifting of the pivot axis during a dumping operation.

As illustrated in FIG. 4, the piston-cylinder units 22 and 24 pivotally move the container 14 into a load discharging position in which the lip 60 of the container extends over the adjacent side wall of the trailer T or other vehicle or container receiving material being discharged from the container 14. During such pivotal movement, the side wall 52 is gradually rotated from an inclined position, as illustrated in solid lines, to a substantially vertical position, as illustrated in phantom. In this manner, the force of gravity is used to ensure complete dumping of the container.

Upon completion of a dumping or load discharging operation, the pistons are withdrawn into the pistion-cylinder units 22 and 24 to rotate the container 14 from the phantom line position illustrated in FIG. 4 to the position illustrated in FIG. 3. Continued retraction of the pistons into the cylinders results in movement of the support frame 16 and container 14 into the position illustrated in FIG. 2.

Since the center of gravity of the container 14 is positioned at all times within the outer limits of the set of tires, there is no need to provide outriggers or other mechanisms to prevent tilting of the vehicle during a dumping operation. Also, since the container 14 is vertically translated before being rotated, there is no need to provide wheel wells in the container 14 to obtain clearance between the container and the tires supporting the chassis. If the desired width of the base of the container is such that wheel wells are necessary, the wheel wells need be no wider than the width of the tires in order to provide the required clearance for tilting or rotation of the container.

Previously, a specific embodiment of the present invention has been described. It should be appreciated, however, that this embodiment has been described for the purposes of illustration only, without any intention of limiting the scope of the present invention. For instance, the vehicle of the present invention can be designed as a self-propelled vehicle, rather than a towed vehicle. It is the intention that the present invention be limited only by the appended claims.

What is claimed is:

1. A transporter for articles comprising:
    container means for receiving articles to be transported;
    chassis means for supporting said container means;
    frame means for supporting said container means on said chassis means, said frame means being vertically translatable a between lowered and a raised position;
    connection means for pivotally interconnecting said frame means with an upper portion of said container means;
    guide means extending upwardly from said chassis means for guiding vertical translation of said frame means, said guide means comprising pairs of adjacent posts at fore and aft ends of said chassis means extending vertically upward from said chassis means, bars interconnecting upper ends of adjacent posts, and blocking means carried by at least one of said bars for stopping upward movement of said frame means after said frame means reaches the raised position thereof; and
    movement means interconnected between said container means and said chassis means for exerting a force on said container means such that the interconnected frame means and container means are translated as a unit from the lowered to the raised position of said frame means and such that said container means is pivoted with respect to said frame means after said frame means has reached the raised position thereof to thereby dump the contents of said container means.

2. A transporter according to claim 1, wherein said container means is pivotal to position a side wall thereof in a vertical orientation, after said frame means has reached the raised position thereof.

3. A transporter according to claim 1, wherein said movement means comprises a piston-cylinder unit having one end pivotally connected to said container means and one end pivotally connected to said chassis means, movement of a piston of said piston-cylinder unit with respect to a cylinder of said unit controlling movement of said container means and said frame means.

4. A transporter according to claim 3, further comprising ground engaging means positioned on both sides of said chassis means for supporting said transporter for movement and wherein said chassis means comprises axle means for supporting said ground engaging means, the connection between said piston-cylinder unit and said container means being positioned no wider than an outermost edge of said ground engaging means in all positions of said container means, and the design of said container means being such that the center of gravity thereof is inwardly spaced from outer edges of said ground engaging means in all positions of said container means.

5. A transporter according to claim 1, wherein said container means comprises a pair of side walls interconnected by front and end walls, one of said side walls being higher than the other of said side walls, with the higher wall being pivotally interconnected with said frame means.

6. A transporter according to claim 1, wherein said frame means comprises roller means engageable with outer surfaces of said posts for guiding movement of said frame means with respect to said posts, plate means for supporting said roller means, and strut means connected to and extending upwardly and outwardly from said plate means for supporting at an upper portion thereof a component of said connection means.

7. A transporter for articles comprising:
    container means for receiving articles to be transported, said container means having a general trough shape with a base, front and rear walls extending upwardly from the base, and side walls extending upwardly and outwardly from the base, with one of said side walls being higher than the other;
    chassis means for supporting said container means;
    ground engaging means connected to said chassis means for supporting said transporter for movement over ground;
    frame means for supporting said container means on said chassis means, said frame means being vertically translatable between raised and lower positions;
    guide means comprising front and rear pairs of interconnected vertical posts carried by front and rear portions of said chassis means, the spacing between the front and rear pairs of posts being greater than the spacing between the front and rear walls of said container means, and horizontally-extending bars interconnecting upper ends of said pairs of posts to each other;
    blocking means carried by said bars for limiting upward movement of said frame means;
    said frame means comprising pairs of front and rear guide assemblies, strut assemblies carried by said pair of guide assemblies, and bar means for interconnecting upper portions of said strut assemblies to each other, each of said pairs of guide assemblies comprising individual guide assemblies having pairs of upper and lower rollers engaged with respective ones of said posts for guiding vertical movement of said frame means, plate means for interconnecting said upper and said lower pairs of rollers, and horizontal bar means for interconnecting plate means of a pair of individual guide assemblies to each other, each of said strut assemblies comprising a first strut having one end rigidly connected to one of said plate means and extending upwardly so that another end is positioned wider and higher than the other plate means of the respective pair of guide assemblies, a second strut having one end rigidly connected to the other plate means and another end rigidly connected to the another end of said first strut and third strut means rigidly connected to portions of said first and second struts intermediate the ends thereof for bracing said struts;
    means for pivotally interconnecting the higher wall of said container means with upper portions of said strut assemblies so that said container means is rotatable about a horizontal axis, the interconnection being such that the horizontal axis is spaced inwardly from an outermost portion of said ground engaging means; and
    movement means having one end pivotally connected to said chassis means and one end pivotally connected to said container means for moving said container means with respect to said chassis means, said movement means having an operating stroke with a first portion for vertically translating said container means between a lowered position and a raised position in such manner that said frame means moves with said container means between the lower and raised positions thereof, and a second portion for rotating said container means when in the raised position thereof about said horizontal axis to thereby dump the contents of said container means.

* * * * *